US010205790B1

(12) United States Patent
Kahn et al.

(10) Patent No.: US 10,205,790 B1
(45) Date of Patent: Feb. 12, 2019

(54) INTEGRATED POSTS AND GUIDANCE

(71) Applicants: Philippe Kahn, Santa Cruz, CA (US); Arthur Kinsolving, Santa Cruz, CA (US)

(72) Inventors: Philippe Kahn, Santa Cruz, CA (US); Arthur Kinsolving, Santa Cruz, CA (US)

(73) Assignee: DP Technologies, Inc., Scotts Valley, CA (US)

(*) Notice: Subject to any disclaimer, the term of this patent is extended or adjusted under 35 U.S.C. 154(b) by 53 days.

(21) Appl. No.: 13/830,298

(22) Filed: Mar. 14, 2013

Related U.S. Application Data

(60) Provisional application No. 61/665,275, filed on Jun. 27, 2012.

(51) Int. Cl.
H04L 29/08 (2006.01)

(52) U.S. Cl.
CPC .................... H04L 67/22 (2013.01)

(58) Field of Classification Search
CPC ......... H04L 67/02; H04L 51/32; H04L 67/22; H04L 67/306
USPC .......................................................... 709/204
See application file for complete search history.

(56) References Cited

U.S. PATENT DOCUMENTS

| 9,473,730 | B1* | 10/2016 | Roy | H04H 60/44 |
|---|---|---|---|---|
| 2007/0174117 | A1* | 7/2007 | Hendrickson | G06Q 30/02 |
| | | | | 705/14.4 |
| 2008/0086356 | A1* | 4/2008 | Glassman et al. | 705/10 |
| 2009/0204640 | A1* | 8/2009 | Christensen | G06Q 30/02 |
| 2010/0205061 | A1* | 8/2010 | Karmarkar | G06Q 30/02 |
| | | | | 705/14.64 |
| 2011/0035284 | A1* | 2/2011 | Moshfeghi | 705/14.58 |
| 2011/0264582 | A1* | 10/2011 | Kim | G06Q 20/102 |
| | | | | 705/40 |
| 2012/0089996 | A1* | 4/2012 | Ramer | H04H 60/46 |
| | | | | 725/14 |
| 2012/0197724 | A1* | 8/2012 | Kendall | G06Q 30/0261 |
| | | | | 705/14.58 |
| 2012/0226471 | A1* | 9/2012 | Yuen | A61B 5/0002 |
| | | | | 702/160 |
| 2012/0272256 | A1* | 10/2012 | Bedi | 725/23 |
| 2013/0066986 | A1* | 3/2013 | DiCosola | 709/206 |
| 2013/0073374 | A1* | 3/2013 | Heath | 705/14.39 |
| 2013/0073377 | A1* | 3/2013 | Heath | G06Q 30/02 |
| | | | | 705/14.39 |
| 2013/0073400 | A1* | 3/2013 | Heath | G06Q 30/02 |
| | | | | 705/14.73 |
| 2013/0132199 | A1* | 5/2013 | Croy | G06Q 30/0267 |
| | | | | 705/14.54 |

(Continued)

*Primary Examiner* — El Hadji M Sall
*Assistant Examiner* — Elizabeth Kassa
(74) *Attorney, Agent, or Firm* — HIPLegal LLP; Judith Szepesi

(57) ABSTRACT

A method or apparatus to provide personalized post and guidance to a user, through a social network feed. The method comprises obtaining user characteristic data, and obtaining temporary characteristic data, the temporary characteristic data including one or more of: a user's motion state, a user's current location, a user's past motion states. The method further comprises making a personalized post available to the user through a newsfeed in a social network, the personalized post requesting engagement, and tracking the engagement of the user with the personalized post.

20 Claims, 10 Drawing Sheets

(56) References Cited

U.S. PATENT DOCUMENTS

| | | | |
|---|---|---|---|
| 2013/0158368 A1* | 6/2013 | Pacione | A61B 5/0022 600/301 |
| 2013/0159885 A1* | 6/2013 | Yerli | 715/753 |
| 2013/0290439 A1* | 10/2013 | Blom | G06Q 50/01 709/206 |

* cited by examiner

Fig. 7A
Fig. 7B
Fig. 7C
Fig. 7D

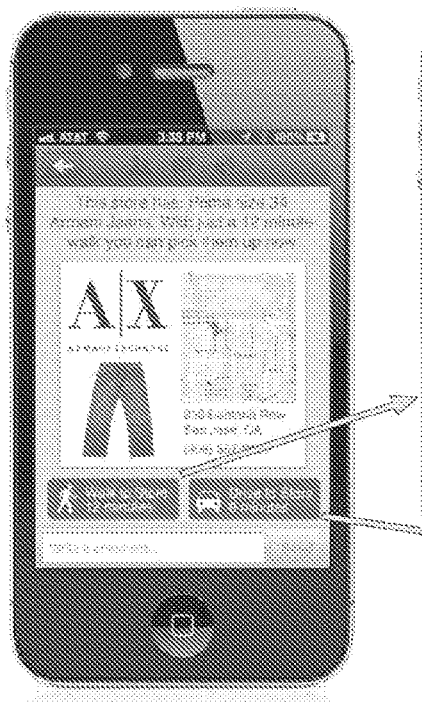
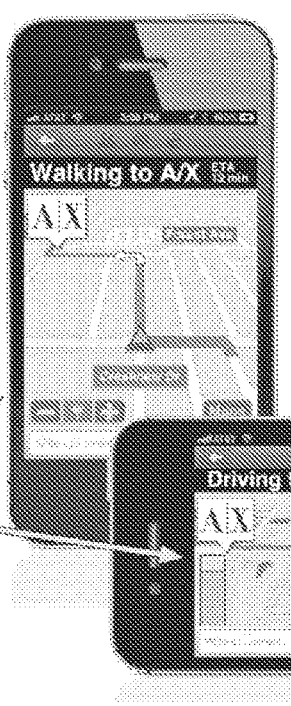
Fig. 9B
Fig. 9C
Fig. 9A

INTEGRATED POSTS AND GUIDANCE

RELATED APPLICATIONS

The present application claims priority to U.S. Provisional Patent Application Ser. No. 61/665,275, filed on Jun. 27, 2012, and incorporated herein by reference in its entirety.

FIELD

The present application is related to integrating personalized posts of interest to a user into a newsfeed, stream, or other social media content, and providing guidance to a location when appropriate.

BACKGROUND

Social networks such as FACEBOOK™ and GOOGLE-PLUS™ provide an experience to users that can include information from various friends, as well as companies to which the user has subscribed. These companies generally post information that is shared with their subscribers.

BRIEF DESCRIPTION OF THE FIGURES

The present invention is illustrated by way of example, and not by way of limitation, in the figures of the accompanying drawings and in which like reference numerals refer to similar elements and in which:

FIG. 7A-7D show illustrations of a social network feed including a post.

FIG. 9A-9C show illustrations of a system providing further data and navigation.

DETAILED DESCRIPTION

Providing relevant-to-the user content in the user's social network feed, on social media sites, is a challenge. The user wants to hear from companies that he or she favors, but prefers not to view pure advertisements, unless they have either entertainment factor or relevance factors. Furthermore, what a user considers interesting may vary by the user's location, current status, motion state, and profile. By targeting details of items inserted into a user's feed, to items that are likely to be considered interesting, the system provides an integrated post of relevant information. When that information concerns a location nearby, the system may also provide integrated guidance to that location for the user.

For example, if a user has become a "fan of" or subscribed to information provided by ARMANI™ the system may enable ARMANI™ to insert information into the user's feed, indicating that an item of interest to the user is available at a nearby store. The system enables the user to select the post, and receive guidance to a location where an action may be taken. In this example, the guidance would be to a location where the user can purchase the item. In one embodiment, this enables compensation of the social media site, for the advertisement, as well as for any completed interactions with the user. By enabling the user to start the guidance directly from the social media feed, the barrier to acting on the information is reduced.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

The term feed, or newsfeed is used to refer to the data presented to a user by a social networking site. This is the "updates" or "front page" of FACEBOOK™, the Twitter stream on TWITTER™, the main page on PINTEREST™, the stream on GOOGLEPLUS™, etc. Each social networking site presents content with information from friends and entities to users. This page will be referred to as "newsfeed" or "feed" for the purposes of this application. Note that while the term "feed" is used, this does not imply a unitary format, or a particular social networking site being used.

Figure 1:
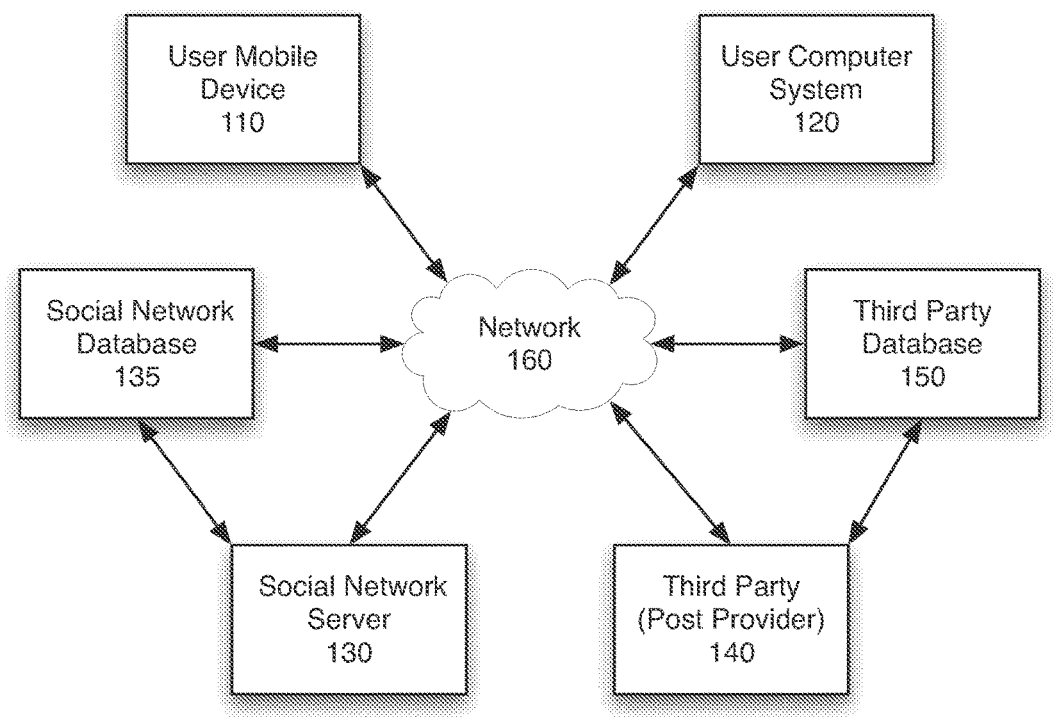
FIG. 1 is a network diagram showing the various elements that may interact in the system.

FIG. 1 is a network diagram showing one embodiment of the various elements that may interact in the system. In one embodiment, the system comprises a social network, presented by social network server 130, and made available to a user via a mobile device 110, and another computer system 120. The social network server 130 is accessible through a network 160 such as the Internet, in one embodiment through a website, as is known in the art.

In one embodiment, third parties may post data on the social network. These posts may be on the third party's own pages on the social network, posts to others' news feeds, and advertising. These third parties 140 may compensate the social network for advertising, on a per-impression, per-click, or other basis. In one embodiment, the third party 140 may host its content on the social network server 130. In one embodiment, the third party 140 may provide specific content, posted to individual user's newsfeed's on the social network server 130. In one embodiment, for enabling personalization of posts, as will be described below, the third party 140 may utilize a third party database 150 which provides relevant characteristics for personalization. In one embodiment, the social network server 130 may also provide a social network database 135, through which the relevant characteristics of the users to whom the third party 140 may post may be made available.

One of skill in the art would understand that although the third party 140 and the social network 130 are illustrated as separate individual logic blocks, the implementation of each may be distributed over many servers, computer systems, and various devices, or multiple elements may be hosted on the same servers. Furthermore, although only a single third party is shown, many third parties, that may or may not be related, may interact with social network 130.

Figure 2:
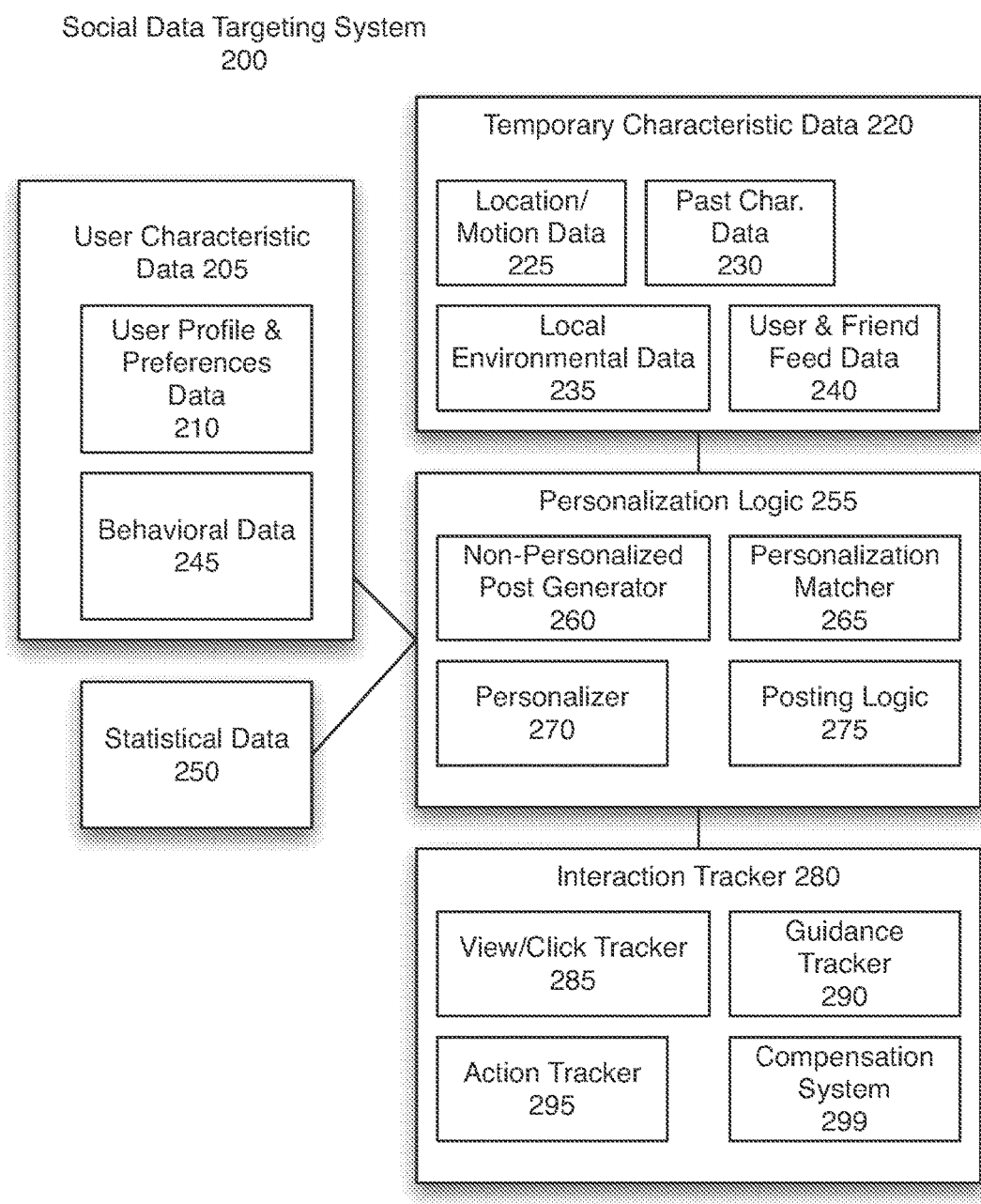
FIG. 2 is a block diagram of one embodiment of the system.

FIG. 2 is a block diagram of one embodiment of the system. The social data targeting system 200 may include elements residing on a server, on a social network server, on third party servers, and the client system residing on the user's device.

The system utilizes data from user profile & preferences data 210, behavioral data 245, and statistical data 250. The user profile and preferences data 210 in one embodiment is obtained from the social network, and optionally also from additional information entered by the user. This information may also be entered by the merchant, when available.

Behavioral data 245 is based on past behaviors of the user, on the social network or elsewhere where either the social network or the social data targeting system 200 itself has data about the user's behavior. Statistical data 250 is based on the collected data of a large number of users. The statistical data 250 is, in one embodiment, correlated with the profile/preferences data.

In addition to such long-term data, the system also utilizes temporary characteristic data 220. Temporary characteristic data 220 may include the user's location/motion data 225, local environmental data 235, user/friend feed data 240, and past characteristic data 230. The location/motion data 225 may be based on a GPS, network triangulator, or other location determining system.

Local environmental data 235 may include environmental information such as weather, location type (e.g. inside building, inside movie theater, etc.). In one embodiment, whether the user is alone is also considered local environmental data 235. User & friend feed data 240 may include information about what the user has said about his or her current state. In one embodiment, feed data may also be used to ensure that the volume of advertising-type posts is below a threshold.

Past characteristic data 230, in one embodiment, may include information about what the user has done in the recent past, based on data from the user's system. For example, when choosing what beverage to advertise to a user, it is useful to know how hot it is, how active the user has been in the recent past/currently, when the user last purchased a drink, etc. This type of information, in one embodiment, may be available through past characteristic data 230.

The personalization logic 255 may be utilized by the third party to generate personalized posts to users. The system may include a non-personalized post generator 260. The non-personalized posts may for example be a general ad. FIG. 7D illustrates one embodiment of a non-personalized post.

The personalization matcher 265 utilizes the data from user profile/preferences 210, behavioral data, statistical data 250, and/or temporary characteristic data 220 to determine whether the non-personalized post should e personalized. In one embodiment, posts are personalized when the personalized post would be relevant to the user. Furthermore, personalization matcher 265, in one embodiment When the personalization matcher 265 determines that the posts can/should be personalized. For example, FIG. 7C shows a personalized ad, in which the user is prompted to visit a dealership for a test drive. Clearly, if the user were in a location where the new car is not available within a reasonable distance for a test drive, such personalization would not be useful.

The personalizer 270 generates the personalized post, based when the personalization match 265 indicates that such a personalization would be appropriate. Posting logic 275 then places the post in the user's feed. In one embodiment, posting logic 275 may time the placing of a post, based on the temporary characteristic data 220. In one embodiment, the system may maintain a queue of personalized posts, which are placed into the user's feed when it is appropriate based on the temporary characteristic data 220.

The interaction tracker 280 tracks the user's interactions, or lack of interaction with the post. View/click tracker 285 utilizes the traditional method of tracking interaction, by click or view. However, guidance tracker 290 utilizes the new metric of whether the user has requested guidance to the location at which the user may follow the advertised action. In the example of FIG. 7C, recommending a test drive, if the user receives guidance from the system to the dealership, this is tracked by guidance tracker 290. In one embodiment, if the user goes to the dealership, without asking for guidance for the system, that is also tracked.

Action tracker 295, in one embodiment, tracks whether the user took the recommended and personalized action. In the example of FIG. 7C, this would be taking the test drive.

In one embodiment, the system's compensation system 299 may provide a different level of compensation to the social media site, based on the level of interaction, e.g. view/click/guidance/action. In one embodiment, only some of these interactions may be rewarded by the system. In one embodiment, the system may allow personalization logic 255 to test various designs of the personalized post, and providing feedback directly or via compensation system 299 of the effectiveness of various layouts or designs.

Figure 3:
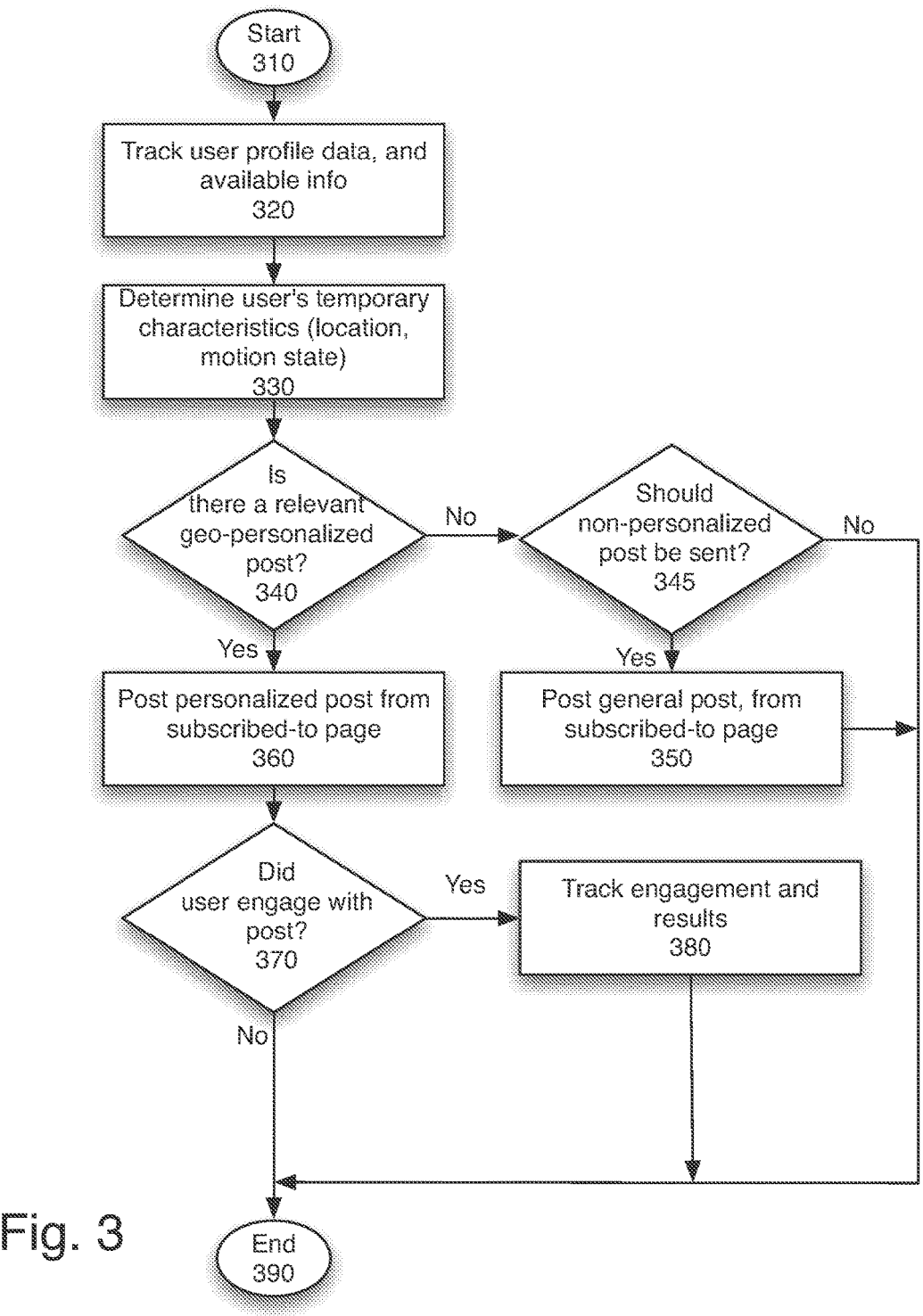
FIG. 3 is an overview flowchart of one embodiment of the system based on subscriptions.

FIG. 3 is an overview flowchart of one embodiment of the system based on subscriptions. The process starts at block 310.

At block 320, the user profile information and available data is tracked. In one embodiment, the social network continuously tracks available information about a user. In one embodiment, this data may include data based on the user's own actions, interactions, friends, as well as profile data added by the user to the social network, or made available to the social network from other sources. In one embodiment, additional data that may be entered by the user into the system may also be included in the user profile information. In one embodiment, additional information obtained by the social data targeting system 200 may also be included.

At block 330, the user's available temporary characteristics are determined. These temporary characteristics may include location and motion state, as well as any additional characteristics. Furthermore, in one embodiment, the motion state includes a current motion state and a recent past motion state. For example, the user's current motion state may be "sitting in the office" but the user's recent past motion state may include "completed 5 mile run." A user with these characteristics may act differently than a user whose recent past motion state has been "sleeping," even if their current motion state is identical.

In one embodiment, the user's motion state is detected by sensors in the mobile device. In one embodiment, the system described in U.S. Pat. No. 8,285,344, issued Oct. 9, 2012, may be used. In one embodiment, the user's location may be determined based on GPS, network triangulation, accelerometer, or other data.

In one embodiment, the temporary characteristics may further be determined based on social network posts, to augment the knowledge of the user's current state. The motion state, past states, as well as other characteristics may be refined based on posts made by the user, or in which the user is tagged. For example, posts may indicate that the user is planning on going out to dinner, or complaining about their laptop not working well, etc. These characteristics may be used to target the personalized posts to the user. The following is a list of some exemplary temporary characteristics, and their source. This list should not be taken as exhaustive. Other source of data, and other characteristics may also be obtained and taken into account when personalizing posts.

- Current Motion State, based on data from mobile device, this may include a navigation mode (e.g. walking v. driving v. on a bus),
- Current location, based on GPS, network triangulation, or other data,
- Past motion state, based on data from mobile device, optionally additional data from user's posts on social media sites,
- Current use of mobile device, based on information from mobile device applications (e.g. on the phone),
- Environmental variables, such as temperature, time of day, barometric pressure, etc. based on sensor data or information on local conditions obtained based on the current location of the user,
- Alone, on in company of others, based on sensor data (near field communication (NFC), Bluetooth or other wireless connection, or data from others' mobile devices), through other data such as posts made by the user or the user's friends, or check-ins or similar activity. In one embodiment, when possible this may include classifying the other persons they are with, e.g. family, friends, co-workers, clients, etc.

At block 340, the process determines whether there is a relevant personalized post for the user. In one embodiment, the personalized post is geo-personalized, e.g. personalized in part based on the user's geographic location. In one embodiment, the personalized post may be personalized based on one or more temporary characteristic.

If no personalized posts are applicable, at block 345, the process determines whether there is a non-personalized version of the post should be added to the user's feed. If so, at block 350, the process posts a general post for the user. In one embodiment, the general post is a post from a subscribed-to page. In one embodiment, the user may subscribe to pages of third parties, who provide services or products of interest to the user. These third party pages may insert posts into the user's newsfeed. The process then ends at block 390. If no non-personalized version of the post was determined to be postable at block 345, the process ends without adding a post into the user's newsfeed.

If there is a relevant personalized post, at block 340, the process at block 360 posts the personalized post for the user. At block 370, the process determines whether the user engaged with the post. In one embodiment, engagement may include "liking" the post or adding a +1 rating to the post. In one embodiment, engagement may include posting a comment. In one embodiment, engagement may include selecting the post, receiving guidance to a destination at which something may be purchased, or some act may be performed. In one embodiment, the guidance comprises navigation along a path to a destination location, to enable the user to purchase the item discussed in the personalized post.

At block 380, the engagement and results are tracked. In one embodiment, this data may be used to provide feedback to the third party that uses post personalization. In one embodiment, this data may be used to obtain compensation from the third party that used the post personalization. For example, in one embodiment, if the user engages with the post and/or purchases an item through the post, the social network may receive a payment from the third party. For example, in one embodiment, if a user follows the guidance to a store, and purchases/test drives/sells the item mentioned in the personalized post, the social network might receive a percentage of the purchase price, or other financial remuneration. This is much more actionable for third parties, than the click-through or presentation-based compensation, as a purchase actually happens. The process then ends at block 390. In one embodiment, the system may also track engagement with general posts. In one embodiment, the differential engagement data may be made available to the third party, the social network, and/or additional relevant entities.

Figure 4:
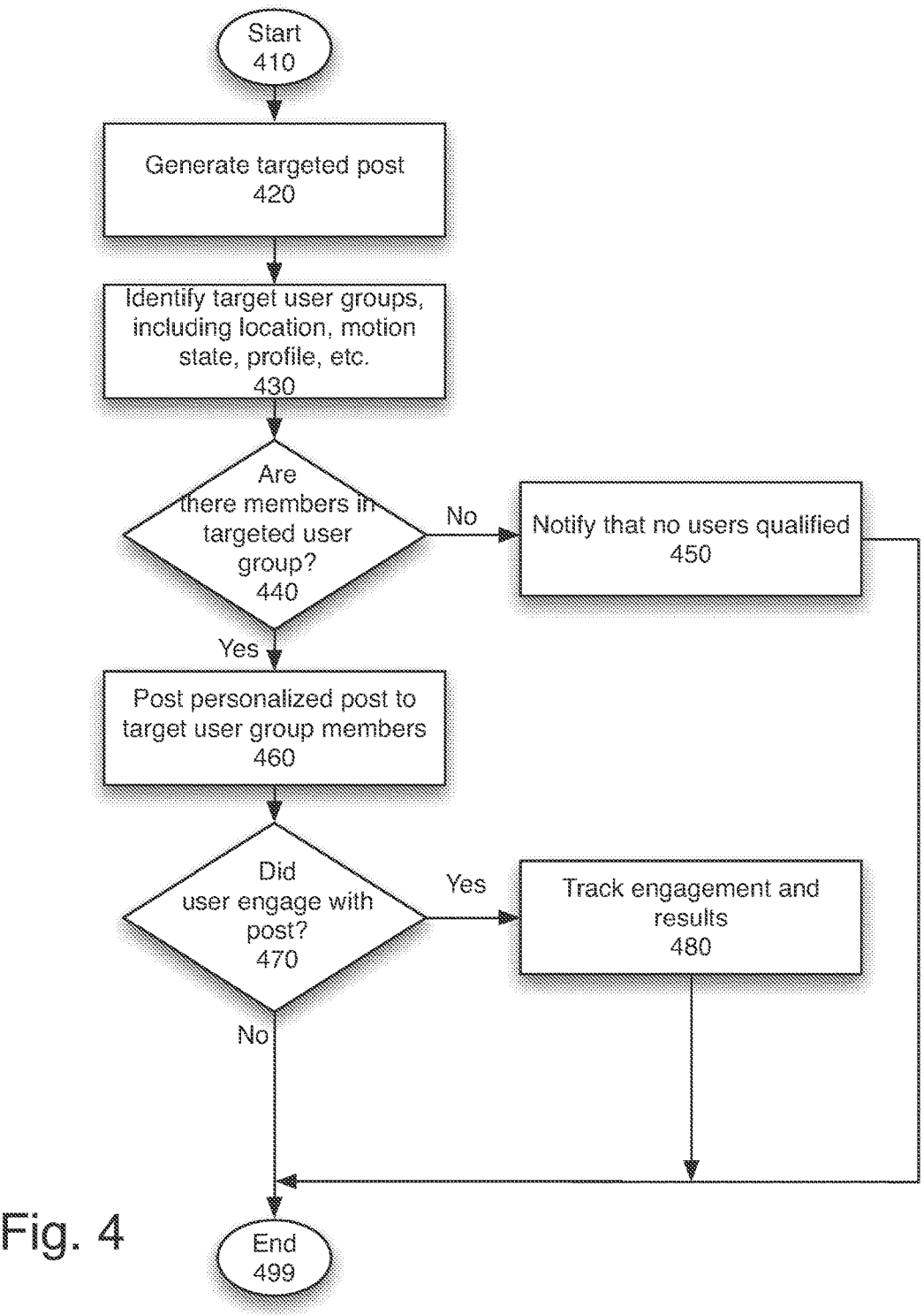
FIG. 4 is an overview flowchart of one embodiment of the system based on targeting.

FIG. 4 is an overview flowchart of one embodiment of the system based on targeting. The process starts at bock 410.

At block 420, a targeted post is generated. The targeted post, in one embodiment, includes a suggestion to go somewhere, purchase something, sell something, or otherwise engage in commerce. FIGS. 7A and 7C both illustrate particular targeted posts. FIG. 7A shows a targeted post, showing that an item of clothing in the user's preferred size is available at a store, while FIG. 7C suggests that the user take a test drive at a nearby dealer for a car.

At block 430, the target user groups are identified, including location, motion state, profile, etc. For example, a local bakery may only provide a post regarding its fresh cookies to those users who are within range of the bakery.

At block 440, the process determines whether there are any members in the targeted user group. As noted above, the targeting may be very specific. For example, for a bakery about to post that it has a new treat freshly made and available, the targeting may be for people who are fans of the bakery's page, who are local currently to the bakery, who are not sleeping, who have not recently checked into another bakery.

If there are no members in the selected group, at block 450, the system indicates that no individuals were in the selected group. In one embodiment, the targeting may then be altered by the third party. In another embodiment, a general non-targeted post may be posted to appropriate users. The process then ends, at block 490.

If there are members in the targeted group, at block 440, the process continues to block 460. At block 460, the personalized post is posted to the target user group members.

At block 470, the process determines whether the user engages with the post. If so, at block 480, the engagement and its results are tracked. As noted above, this data may be used to provide value to the third party, and compensation to the social network. The user may also be compensated, in one embodiment. In one embodiment, the user does need to actively subscribe to a page, or otherwise engage with a third party to receive these personalized posts. In another embodiment, the posting may be automatic based on the information available about the user. Furthermore, these posts may be posted in the user's news stream, in one embodiment. In one embodiment, posts may be advertisements presented to the user, either inline, in a side bar, as a pop-up or in another format.

In one embodiment, the use of this feature may be based on user profile, preferences, past behavior (what this user buys, likes to do, etc.) In one embodiment, by creating a social media account and using the social media site, the site gradually learns the user's preferences and automatically tailors posts to what the user would like.

Figure 5:
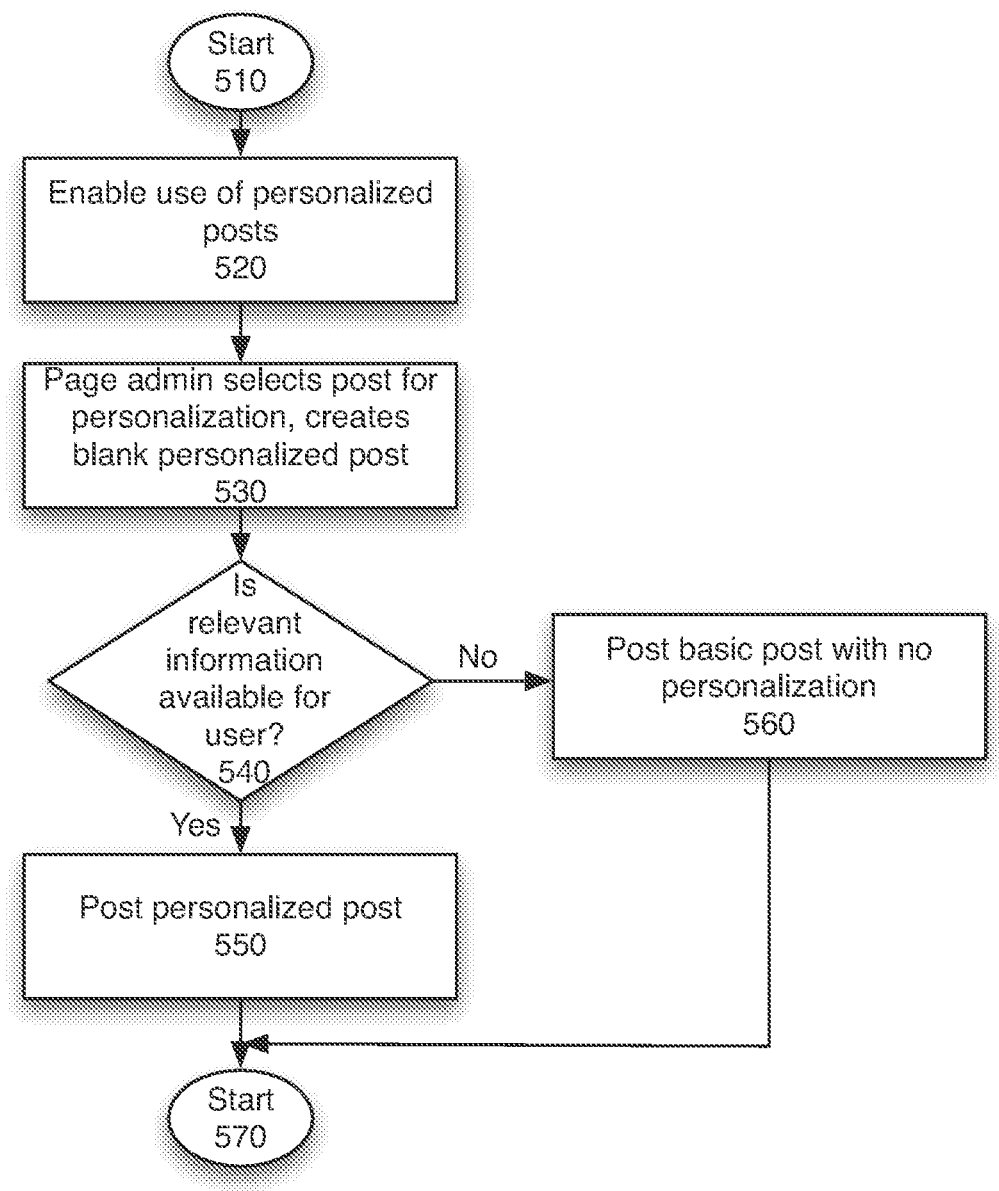
FIG. 5 is a flowchart of one embodiment of enabling post customization.

FIG. 5 is a flowchart of one embodiment of enabling post customization. The process starts at block 510. In one embodiment, this process is made available to the third parties who set up pages and/or to third party advertisers.

At block 520, a social network enables the use of personalized posts. In one embodiment, the personalized posts may be enabled on a third party site, through a third party system, or directly by the social network.

At block 530, an administrator selects a post for personalization. In one embodiment, the post may be a modification of a standard post. In another embodiment, the post may be a uniquely personalized post only. The administrator then creates the blank personalized post. In one embodiment, the relevant information, to fill in the blanks, may be added through a database. For example, the relevant personalized information may include a location of a store at which an item can be purchased, the relevant sizing of the object, for the user, the particular type of object available, the colors available, etc.

FIG. 7A shows such a personalized post. The post includes a "Go" link, linking the user to a nearby A|X Armani Exchange™ store. The post further notes that the user's size in the jeans (Prima size 34 jeans) is available in that store. In one embodiment, the blank "personalized post" would say "Pants size X, In-store pickup just M transport. The X denotes the user's size, the Pants denotes the user's preferred pants brand and/or style (e.g. Prima brand jeans, slacks, shorts, etc.), the M denotes the number of minutes, and transport indicates the mode of transport recommended (e.g. walk, drive, bus ride, etc.) The personalized post for one particular user, thus, may be Prima Jeans, size 34, available just a five-minute walk from you! Click to get directions. Thus, the administrator would prepare a blank personalized post, and the data for each individual user's post may be pulled in from a database.

In contrast, the personalized post shown in FIG. 7C appears the same to all users, and only personalizes the location indicated when the user selects the "Go" button. The guidance would be to the nearest Mercedes Benz dealer that carries this particular vehicle, where the user would be able to test drive.

Returning to FIG. 5, at block 540, the process determines whether the relevant information is available for the user. As noted above, the user's information may require as varied a set of data as their clothing size, beverage preference, meal preference, favorite author, etc. In one embodiment, the blank personalized post may include "necessary" elements as well as optional elements. For example, in the Armani Exchange post below, the user's size may be considered "necessary" for personalization, while their pants preference may be considered optional, or vice versa. In one embodiment, the user's location is a necessary element.

If the information to fill in the necessary elements for the user is not available, at block 560 in one embodiment a basic post is posted with no personalization. If the relevant information is available, at block 550, the personalized post is posted. The process then ends at block 570.

Figure 6:
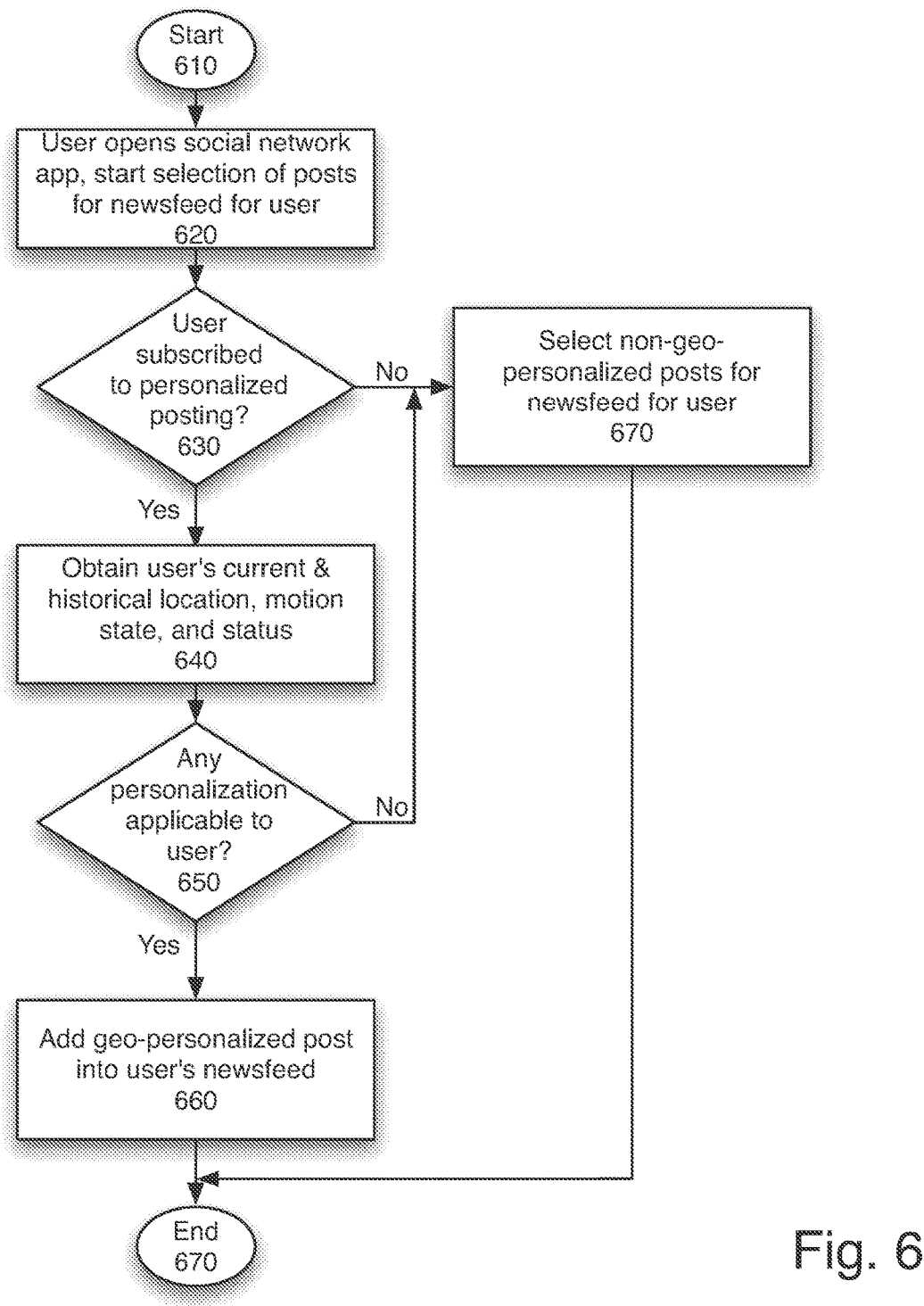
FIG. 6 is a flowchart of one embodiment of inserting relevant posts into a social network feed.

FIG. 6 is a flowchart of one embodiment of inserting relevant posts into a newsfeed. The process starts at block 610. This describes one embodiment of the interaction of the social media site, and the user.

At block 620, the user opens the social network app, and the social network starts selecting posts for the user's newsfeed. In one embodiment the social network application may be an application on a mobile device. In one embodiment, the social network app may be a website, accessed through a mobile, tablet, or other computer.

At block 630, the process determines whether the user is subscribed to personalized posting. In one embodiment, a user may opt out of personalized posting, or may not be subscribed to any pages or other sources of personalized posting. If that is the case, at block 670, the user's newsfeed is presented, with non-geo-personalized posts. The process then ends at block 680.

FIG. 7D contrasts a newsfeed without a personalized post, compared to FIG. 7C, which shows the same newsfeed with a personalized post. As can be seen in FIG. 7D, the same post is shown as in personalized newsfeed of FIG. 7C, however, the option to test-drive with the "Go" and "More" selections below are not available. Alternative, as shown in FIGS. 7A and 7B, the entire post may be absent from the user's newsfeed.

Returning to FIG. 6, if the user is subscribed to personalized posting, at block 640, the user's temporary characteristics are obtained. These temporary characteristics may include the user's current and historical location, current and historical motion state, and status. In one embodiment, local environmental data also be added to the user's temporary characteristics (e.g. a user's temporary characteristics may be "walking alone, after running 5 miles, talking on the telephone, in 90 degree dry weather, at 1234 Main Street, Santa Cruz, Calif., walking west." This data is all "temporary" as it does not describe long-term state of the user.

At block 650, the process determines whether any personalization applies to the user. As noted above, the personalization may depend on various temporary characteristics, such as location, motion state, past location or motion state, etc. For example, in the above instance, an offer for a cold drink may be appreciated, while an offer to buy a winter coat would likely not be relevant. If no personalization is available, the process returns to block 670, to select the non-personalized posts for the user.

If personalization applies, the personalized posts are inserted into the user's newsfeed at block 660. In one embodiment, the user's newsfeed does not emphasize or otherwise mark these personalized posts as being advertising, or different. However, the personalized posts, in one embodiment, have the "More" and "Go" options available, as shown in FIGS. 7A and 7C. In one embodiment, alternative labels may be used, or fewer or more selections may be presented to the user. The process then ends at block 670.

Figure 8:
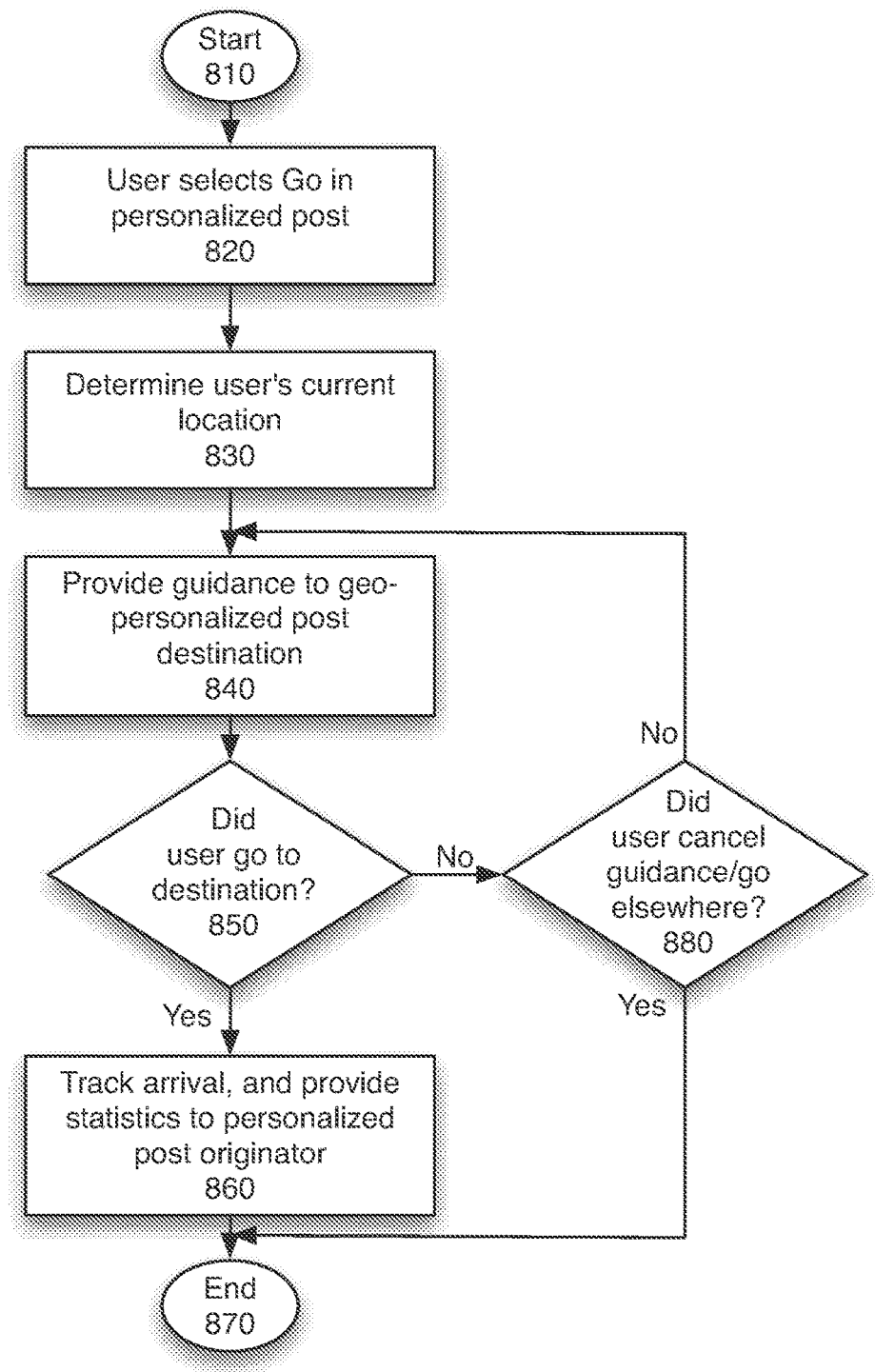
FIG. 8 is a flowchart of one embodiment of providing data and navigation, through the post.

FIG. 8 is a flowchart of one embodiment of providing data and guidance, through the post. In one embodiment, the guidance provided by the personalized post includes navigation to a location relevant to the personalized post. For example, in the post shown in FIG. 7A, the navigation would be to the store. In the personalized post shown in FIG. 7C, the navigation would be to a dealership where the user may take a test drive.

At bock 820 the user selects "Go" indicating that he or she wishes to receive guidance to the location referenced in the personalized post. In one embodiment, when the user presses "More" guidance options are shown. FIG. 9A illustrates an exemplary display. As can be seen, the user may select guidance via walking or driving.

At block 830, the user's current location is determined.

At block 840, guidance is provided to the geo-personalized post destination. In one embodiment, the guidance may include one of walking, driving, bicycling, or using public transportation. Other transportation mechanisms, as appropriate, may be provided as guidance options. FIGS. 9B and 9C illustrate the guidance which may be provided. In one embodiment, the guidance provided is within the social media application. In another embodiment, the social media application may open a separate window, or application, through which guidance may be obtained. In one embodiment, if the guidance is provided through a separate application, the separate application returns the user to the social media application when the user cancels guidance, or otherwise indicates termination of guidance.

At block 850, the process determines whether the user went to the destination. If the user has not gone to the destination yet, at block 880, the process determines whether the user canceled guidance or otherwise indicated that he or she does not wish to continue to the destination. If no such indication was received, the process returns to block 840, to continue providing guidance to the user.

If the user did cancel the guidance, the process ends, at block 870. In one embodiment, the initiation and cancellation of guidance is tracked, and this data is made available to the originator of the personalized post.

If the user did go to the destination, as found at block 850, at block 860, the arrival of the user is tracked. Success data may be provided to the originator of the personalized post. The process then ends at block 870. In one embodiment, for any personalized post, statistical data is provided regarding user engagement. The statistical data may highlight such features as user's lack of interest in shopping between certain times, user's interest in purchasing coffee drinks in the mid-afternoon, user's failure to follow navigation for anywhere further than 10 minutes away, etc. This feedback data may be used by the personalized post originator to further tailor personalized posts. It may also be used in compensating the social media site.

Figure 10:
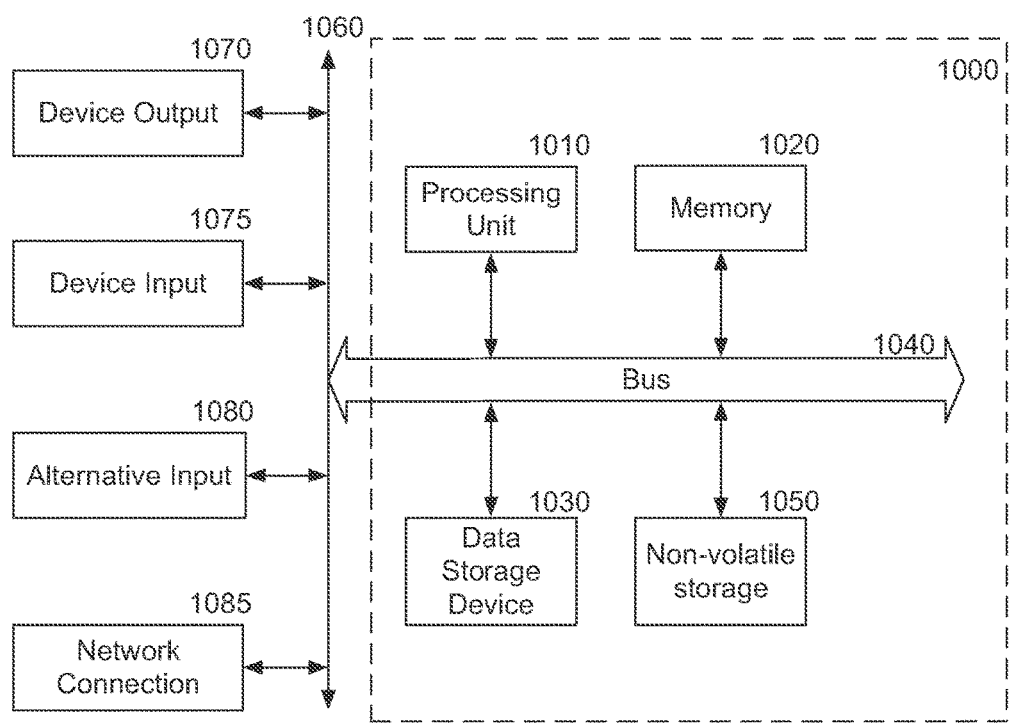
FIG. 10 is a block diagram of a computer system that may be used with the present invention.

FIG. 10 is a block diagram of a particular machine, which may be used with the present invention. It will be apparent to those of ordinary skill in the art, however that other alternative systems of various system architectures may also be used.

The data processing system illustrated in FIG. 10 includes a bus or other internal communication means 1040 for communicating information, and a processing unit 1010 coupled to the bus 1040 for processing information. The processing unit 1010 may be a central processing unit (CPU), a digital signal processor (DSP), or another type of processing unit 1010.

The system further includes, in one embodiment, a random access memory (RAM) or other volatile storage device 1020 (referred to as memory), coupled to bus 1040 for storing information and instructions to be executed by processor 1010. Main memory 1020 may also be used for storing temporary variables or other intermediate information during execution of instructions by processing unit 1010.

The system also comprises in one embodiment a read only memory (ROM) 1050 and/or static storage device 1050 coupled to bus 1040 for storing static information and instructions for processor 1010. In one embodiment, the system also includes a data storage device 1030 such as a magnetic disk or optical disk and its corresponding disk drive, or Flash memory or other storage that is capable of storing data when no power is supplied to the system. Data storage device 1030 in one embodiment is coupled to bus 1040 for storing information and instructions.

The system may further be coupled to an output device 1070, such as a cathode ray tube (CRT) or a liquid crystal display (LCD) coupled to bus 1040 through bus 1060 for outputting information. The output device 1070 may be a visual output device, an audio output device, and/or tactile output device (e.g. vibrations, etc.)

An input device 1075 may be coupled to the bus 1060. The input device 1075 may be an alphanumeric input device, such as a keyboard including alphanumeric and other keys, for enabling a user to communicate information and command selections to processing unit 1010. An additional user input device 1080 may further be included. One such user input device 1080 is cursor control device 1080, such as a mouse, a trackball, stylus, cursor direction keys, or touch screen, may be coupled to bus 1040 through bus 1060 for communicating direction information and command selections to processing unit 1010, and for controlling movement on display device 1070.

Another device, which may optionally be coupled to computer system 1000, is a network device 1085 for accessing other nodes of a distributed system via a network. The communication device 1085 may include any of a number of commercially available networking peripheral devices such as those used for coupling to an Ethernet, token ring, Internet, or wide area network, personal area network, wireless network, or other method of accessing other devices. The communication device 1085 may further be a null-modem connection, or any other mechanism that provides connectivity between the computer system 1000 and the outside world.

Note that any or all of the components of this system illustrated in FIG. 10 and associated hardware may be used in various embodiments of the present invention.

It will be appreciated by those of ordinary skill in the art that the particular machine, which embodies the present invention, may be configured in various ways according to the particular implementation. The control logic or software implementing the present invention can be stored in main memory 1020, mass storage device 1030, or other storage medium locally or remotely accessible to processor 1010.

It will be apparent to those of ordinary skill in the art that the system, method, and process described herein can be implemented as software stored in main memory 1020 or read only memory 1050 and executed by processor 1010. This control logic or software may also be resident on an article of manufacture comprising a computer readable medium having computer readable program code embodied therein and being readable by the mass storage device 1030 and for causing the processor 1010 to operate in accordance with the methods and teachings herein.

The present invention may also be embodied in a handheld or portable device containing a subset of the computer hardware components described above. For example, the handheld device may be configured to contain only the bus 1040, the processor 1010, and memory 1050 and/or 1020.

The handheld device may be configured to include a set of buttons or input signaling components with which a user may select from a set of available options. These could be considered input device #1 1075 or input device #2 1080. The handheld device may also be configured to include an output device 1070 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 1010, a data storage device 1030, a bus 1040, and memory 1020, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1085.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1010. A machine-readable medium includes any mechanism for storing information in a form readable by a machine (e.g. a computer). For example, a machine-readable medium includes read-only memory (ROM), random access memory (RAM), magnetic disk storage media, optical storage media, flash memory devices, or other storage media that may be used for temporary or permanent data storage. In one embodiment, the control logic may be implemented as transmittable data, such as electrical, optical, acoustical, or other forms of propagated signals (e.g. carrier waves, infrared signals, digital signals, etc.)

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method of personalizing a post for a user, comprising:
obtaining user characteristic data, describing long-term characteristics of the user, wherein user characteristic data comprises at least one of user profile data, preferences data, behavioral data, and statistical data;
obtaining temporary characteristic data from a mobile device of the user, the temporary characteristic data comprising: a user's current motion state, a user's current location, a user's past motion state, and a user's past location, wherein the user's past motion state identifies a specific physical activity from at least three possible physical activities and is determined by a device worn by the user; and
wherein the user's current motion state identifies a specific physical activity from at least three possible physical activities and is determined by a device worn by the user;
selecting a personalized post by identifying an offer relevant to the user's interests based on the user characteristic data and the temporary characteristic data including the user's current motion state, the user's current location, the user's past motion state, and the user's past location;
making the personalized post available to the user through a newsfeed in a social network, the personalized post requesting engagement; and
tracking the engagement of the user with the personalized post based on the temporary characteristic data.

2. The method of claim 1, wherein the temporary characteristic data further includes local environmental data, and data obtained from the user's recent posts and comments on the social network.

3. The method of claim 1, wherein the user characteristic data includes user profile data, indicating the user's preferences.

4. The method of claim 1, wherein the tracking of the engagement comprises tracking one or more of: views of the post, clicks on the post, guidance to a destination indicated by the post, and actions taken by the user at the destination.

5. A social data targeting system, comprising:
a post generator to generate a social media post for personalization;
a personalizer to receive temporary characteristic data comprising the user's current location and current motion state and the user's past location and past motion state, and user characteristic data, and to personalize the post based on the temporary characteristic data and the user characteristic data, wherein the user's past motion state identifies whether the user was exercising and is determined by a device worn by the user, wherein user characteristic data comprises at least one of user profile data, preferences data, behavioral data, and statistical data and wherein the user's current motion state identifies a specific physical activity from at least three possible physical activities and is determined by a device worn by the user; and
an interaction tracker to track interactions of the user with the personalized post the interactions based in part on the user's current location and past motion state after seeing the personalized post.

6. The social data targeting system of claim 5, further comprising:
a personalization matcher to determine when the user characteristic data is relevant to insert into the post, the personalizer to tailor the personalized post using the user characteristic data;
otherwise the social data targeting system to provide a general post in place of the personalized post.

7. The social data targeting system of claim 5, wherein the temporary characteristic data includes one or more of: the local environmental data, past characteristic data, and user posts, likes, and responses in the social media network.

8. The social data targeting system of claim 7, wherein the past characteristic data comprises past motion data.

9. The social data targeting system of claim 5, wherein the user characteristic data includes one or more of user profile data, user preferences data, user behavioral data.

10. The social data targeting system of claim 5, further comprising:
the interaction tracker to track one or more of views, clicks, uses of guidance, taking of actions, based on the post.

11. The social data targeting system of claim 5, further comprising using statistical data based on aggregate behaviors of users, to further target personalization of the post.

12. A method of providing targeted posts to a user in a social media network, comprising:
receiving temporary characteristic data comprising the user's location, current motion state, and past motion state, wherein the user's past motion state identifies whether the user was exercising and is determined by a device worn by the user, wherein user characteristic data comprises at least one of user profile data, preferences data, behavioral data, and statistical data and wherein the user's current motion state identifies a specific physical activity from at least three possible physical activities and is determined by a device worn by the user;
receiving user characteristic data;
personalizing a post for the user based on the temporary characteristic data, the user characteristic data, and the local environmental data; and tracking an interaction of the user with the personalized post.

13. The method of claim 12, further comprising:
prior to personalizing, determining whether the post is capable of being personalized for the user.

14. The method of claim 12, wherein the temporary characteristic data includes one or more of: the local environmental data, past characteristic data, past motion data, and user posts, likes, and responses in the social media network.

15. The method of claim 12, wherein the user characteristic data includes one or more of user profile data, user preferences data, user behavioral data.

16. The method of claim 12, further comprising:
tracking the interactions including one or more of: views, clicks, uses of the guidance, taking of actions based on the post.

17. The method of claim 12, further comprising using statistical data based on aggregate behaviors of users, to further target personalization of the post.

18. The method of claim 1, wherein the at least three possible physical activities comprise: running, walking, and sleeping.

19. The system of claim 5, wherein the past motion state comprises one of the exercise motion states of running, walking, and the non-exercise motion state of sleeping.

20. The method of claim 12, wherein the past motion state comprises one of the exercise motion states of running, walking, and the non-exercise motion state of sleeping.

\* \* \* \* \*